US012774910B2

(12) United States Patent
Sun et al.

(10) Patent No.: US 12,774,910 B2
(45) Date of Patent: Oct. 27, 2026

(54) DEVICE FOR MONITORING FOAM VOLUME, FLOW PATTERN, AND PRESSURE DROP IN FOAM DRAINAGE GAS RECOVERY

(71) Applicant: Southwest Petroleum University, Chengdu (CN)

(72) Inventors: Jie Sun, Chengdu (CN); Ziqiang Wang, Chengdu (CN); Jiaqiang Jing, Chengdu (CN); Yufan Yang, Chengdu (CN); Wen Zhang, Chengdu (CN); Chengxuan Wu, Chengdu (CN); Qiuyue Wang, Chengdu (CN); Yongzhen Feng, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 213 days.

(21) Appl. No.: 18/931,085

(22) Filed: Oct. 30, 2024

(65) Prior Publication Data

US 2025/0362162 A1 Nov. 27, 2025

(30) Foreign Application Priority Data

May 21, 2024 (CN) ......................... 202410631714.6

(51) Int. Cl.
*G01F 1/44* (2006.01)
*G01F 1/7086* (2022.01)
*G01F 1/74* (2006.01)

(52) U.S. Cl.
CPC .............. *G01F 1/44* (2013.01); *G01F 1/7086* (2013.01); *G01F 1/74* (2013.01)

(58) Field of Classification Search
CPC . G01F 1/34; G01F 1/44; G01F 1/7086; G01F 1/74; G01F 1/36; G01F 1/88; G01F 1/383; G01F 1/662; G01F 1/6847; G01F 1/6842; G01P 5/02
USPC .......................................... 73/861.04, 861.42
See application file for complete search history.

(56) References Cited

U.S. PATENT DOCUMENTS

2022/0412862 A1* 12/2022 Li ......................... B01F 23/235

FOREIGN PATENT DOCUMENTS

CN 117030601 A * 11/2023 ............. G01N 21/01

* cited by examiner

*Primary Examiner* — John E Breene
*Assistant Examiner* — Truong D Phan

(57) ABSTRACT

A device for monitoring foam volume, flow pattern, and pressure drop in foam drainage gas recovery includes a foam storage tank, a screw pump, valves, a gas tank, a silicon photocell board, a test pipe section, fixed pipes, reduction nipples, telescopic hoses, a color tracer injector, a differential pressure transmitter, an infrared light source, a high-speed camera, a base, rotating shafts, a waste liquid bucket, and a computer terminal and data acquisition system. The device is used to monitor the foam volume under different pipe diameters and materials, the flow pattern, and pressure drop of a flow of the mixed foam and gas. The foam volume is calculated based on light intensities of the infrared light received by the silicon photocell board and a flow velocity of the color tracer, the flow pattern is observed by the high-speed camera, and the pressure drop is measured by the differential pressure transmitter.

4 Claims, 3 Drawing Sheets

DEVICE FOR MONITORING FOAM VOLUME, FLOW PATTERN, AND PRESSURE DROP IN FOAM DRAINAGE GAS RECOVERY

TECHNICAL FIELD

The disclosure relates to the field of foam drainage gas recovery researches, and particularly to a device and a method for monitoring foam volume, flow pattern, and pressure drop in foam drainage gas recovery.

BACKGROUND

During the gas-field development, there is usually a large amount of formation water at the bottom of the well. If the energy of a reservoir gas itself is not sufficient to carry the formation water out, the formation water will gradually accumulate in the wellbore and near the bottom of the well during a lifting process of the gas flow, thereby forming a liquid column and exerting additional hydrostatic back pressure on the gas reservoir, further leading to a continuous decline in the self-venting capacity of the gas well. Therefore, in the gas-field development of natural gas wells with water production, surfactants are usually injected. With the agitation of the natural gas flow, the water is dispersed to form a large amount of low-density foam, which then changes the gas-liquid flow state in the wellbore and enhances the ability of the gas well to carry water.

However, the effect of foam drainage gas recovery is greatly affected by the foam volume. Both excess and insufficient amounts of the foam can affect gas recovery and flow within the pipeline, and monitoring the foam volume is also key to guiding the subsequent addition of defoaming agents in the field. Therefore, based on the principle that the intensity of infrared light attenuates differently when transmitted through liquids and gases, it is considered to use an infrared light source to pass through the pipeline, and then the light intensity is received by a silicon photocell board to measure the foam height inside the pipeline, thereby measuring the foam volume. While monitoring the foam volume, it is also possible to study its flow pattern characteristics and pressure drop rules, fully characterizing the flow pattern characteristics under the foam volume, providing a good basis for the subsequent addition of defoaming agents and methods.

Moreover, the diameter and the material of the pipeline used under different extracted gas and reservoir pressure conditions are not the same, and the foam volume, the flow pattern characteristics, and the pressure drop rules are also greatly affected. It is necessary to design a device with replaceable diameter and material of the pipeline to simulate and monitor the foam volume and the flow pattern characteristics under different foam drainage gas recovery field environments.

SUMMARY

The disclosure aims to provide a device and a method for monitoring foam volume, flow pattern and pressure drop in foam drainage gas recovery, which can monitor the foam volume, flow pattern characteristics and pressure drop rules of foam-gas flow under different pipe diameters and materials.

To achieve the above functions, the technical solutions of the disclosure are as follows.

Specifically, a device for monitoring foam volume, flow pattern, and pressure drop in foam drainage gas recovery includes a foam storage tank, a screw pump, valves, a gas tank, a silicon photocell board, a test pipe section, fixed pipes, reduction nipples, telescopic hoses, a color tracer injector, a differential pressure transmitter, an infrared light source, a high-speed camera, a base, rotating shafts, a waste liquid bucket, and a computer terminal and data acquisition system.

The fixed pipes, the reduction nipples, the telescopic hoses, and the test pipe section form a replaceable pipe section. The foam storage tank and the gas tank are both located on a side of the replaceable pipe section. The foam storage tank is connected to the screw pump and a valve C of the valves, and the gas tank is connected to a valve A of the valves. The valve A and the valve C converge at a left end of the replaceable pipe section. A right end of the replaceable pipe section is connected to a valve B of the valves, and the valve B ultimately is connected to the waste liquid bucket. The silicon photocell board, the differential pressure transmitter, the infrared light source, and the high-speed camera are connected to the computer terminal and data acquisition system.

An infrared laser assembly includes the infrared light source and the high-speed camera, and the infrared light source and the high-speed camera are disposed on the base with a same horizontal line. There are two rotating shafts, which are disposed between the base and the infrared light source. The two rotating shafts are configured to connect the base to the infrared light source and the high-speed camera, and an elliptical plate is configured to control the infrared light source and the high-speed camera to move up and down by pulling itself.

The PN junction on the silicon photovoltaic board and the infrared light source are at equal heights, distributed on both sides of the replaceable pipe section, and are at equal heights with the test pipe section. When the infrared light is irradiated to the PN junctions, electromotive force is generated at two ends of each PN junction, and certain current and certain voltage are output between electrodes.

The replaceable pipe section is divided into four parts, the center part is the test pipe section and the infrared light source, high-speed camera and differential pressure transmitter are used to test the pipe section. The reduction nipples directly screwed to the test pipe section is configured to replace the test pipe section, and the reduction nipples are composed of different sizes of nuts connected by threading, with threads on both an inside and an outside of each nut. Outsides of the reduction nipples are connected to the telescopic hoses; the telescopic hoses are capable of being stretched in and out, and are configured to make it more convenient to replace the test pipe section, and the telescopic hoses are connected outward to the fixed pipes.

The device is used to monitor the foam volume under different pipe diameters and materials, and observe the flow pattern and resistance characteristics under the foam volume.

When using the device, the foam is poured into the foam storage tank, and the screw pump, the valve A, and the valve C are simultaneously opened. Foam and gas are mixed and flow into the test pipe section through the telescopic hoses and the reduction nipples. After the mixed foam and gas is flowed into the test pipe section, the infrared light source and the high-speed camera are turned on, and then the infrared light passes through the test pipe section and radiates on the PN junctions of the silicon photocell board, thereby generating an electric potential at two ends of each PN junctions, and the certain current and voltage are output between the electrodes. A theoretical signal curve at a receiving end is analyzed to obtain a length of a segment of the foam in the pipe (i.e., the test pipe section) or a height of different fluids occupying an internal space of the pipe under different flow conditions, and a cross-sectional area occupied by different fluids in the horizontal pipe is calculated by combining an internal diameter of the pipe. For determination of foam flow rate, an end of the test pipe section is provided with the color tracer injector. The color tracer injector is configured to record a time of the color tracer taking to flow through the test pipe section. An average flow velocity of the foam is determined by a quotient of a distance and the time, thereby ultimately achieving monitoring the foam volume. When monitoring the foam volume, characteristics of the flow pattern within the test pipe section are continuously captured and recorded by using the high-speed camera, and the pressure drop at the two ends of the test pipe section is obtained by using the differential pressure transmitter, thereby achieving synchronously monitoring the foam volume, the flow pattern, and resistance characteristics of a flow of mixed foam and gas.

When replacing the test pipe section, the nuts of the reduction nipples are unscrewed to remove the test pipe section, then the telescopic hoses are squeezed out, followed by attaching another test pipe section, and the foam and the gas are injected again to carry out the same testing steps, thereby achieving monitoring of the foam volume under different pipe materials or diameters.

The beneficial effects of the disclosure are as follows.

1. Currently, there is no effective device or method to accurately measure the foam flow rate during the foam drainage gas recovery. The device of the disclosure can simulate the monitoring of the foam volume under field conditions, providing a theoretical basis for the subsequent dosage and method of foam depressant injection in the foam drainage gas recovery.
2. When monitoring the foam volume, the device can also determine the flow pattern and resistance characteristics under the foam volume, achieving synchronous research on the foam volume, the flow pattern, and resistance characteristics of a flow of the mixed foam and gas.
3. Under different field conditions, the diameter and material of the test pipe section used in the foam drainage gas recovery may vary. The device of the disclosure can replace the test pipe section at any time, making it suitable for various field conditions of the foam drainage gas recovery.

DESCRIPTION OF REFERENCE SIGNS

Figure 1:
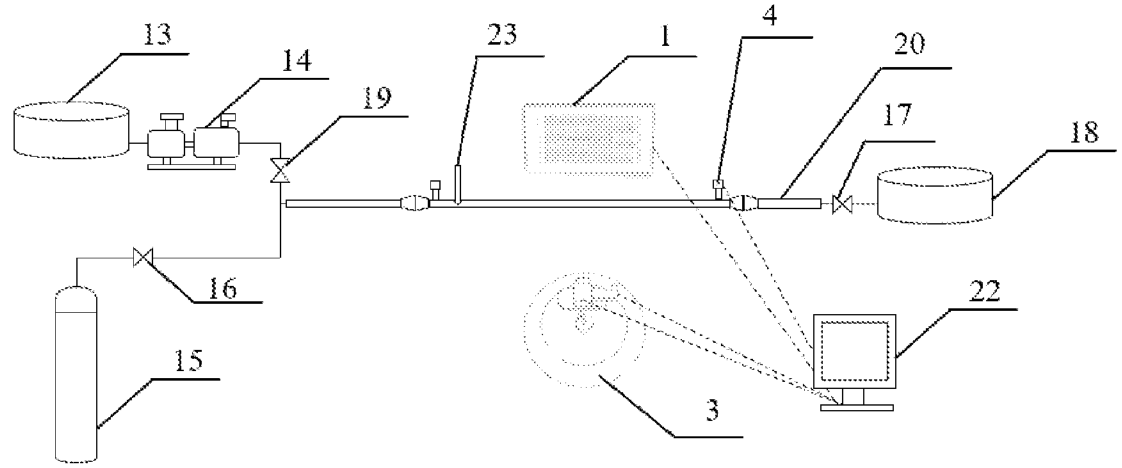
FIG. 1 illustrates an overall plan view of a device for monitoring foam volume, flow pattern, and pressure drop in foam drainage gas recovery of the disclosure.

1. silicon photocell board; 2. test pipe section; 3. infrared laser assembly; 4. differential pressure transmitter; 5. telescopic hose; 6. reduction nipple; 7. nut of the reduction nipple; 8. high-speed camera; 9. infrared light source; 10. rotating shaft; 11. base; 12. PN junction; 13. foam storage tank; 14. screw pump; 15. gas tank; 16. valve A; 17. valve B; 18. waste liquid bucket; 19. valve C; 20. fixed pipe; 21. elliptical plate; 22. computer terminal and data acquisition system; 23. color tracer injector.

DETAILED DESCRIPTION OF EMBODIMENTS

The disclosure will be further explained with reference to the attached drawings. An infrared light source, a silicon photocell board, and a high-speed camera of the disclosure are all existing products on the market.

A device for monitoring foam volume, flow pattern, and pressure drop in foam drainage gas recovery includes a foam storage tank 13, a screw pump 14, valves, a gas tank 15, a silicon photocell board 1, a test pipe section 2, fixed pipes 20, reduction nipples 6, telescopic hoses 5, a color tracer injector 23, a differential pressure transmitter 4, an infrared light source 9, a high-speed camera 8, a base 11, rotating shafts 10, a waste liquid bucket 18, and a computer terminal and data acquisition system 22.

As shown in FIG. 1, the fixed pipes 20, the reduction nipples 6, the telescopic hoses 5, and test pipe section 2 form a replaceable pipe section. The foam storage tank 13 and the gas tank 15 are both located on a side of the replaceable pipe section. The foam storage tank 13 is connected to the screw pump 14 and a valve C 19 of the valves, and the gas tank 15 is connected to a valve A 16 of the valves. The valve A 16 and the valve C 19 converge at a left end of the replaceable pipe section. A right end of the replaceable pipe section is connected to a valve B 17 of the valves, and the valve B ultimately is connected to the waste liquid bucket 18. The silicon photocell board 1, the differential pressure transmitter 4, the infrared light source 9, and the high-speed camera 8 are connected to the computer terminal and data acquisition system 22.

Figure 2:
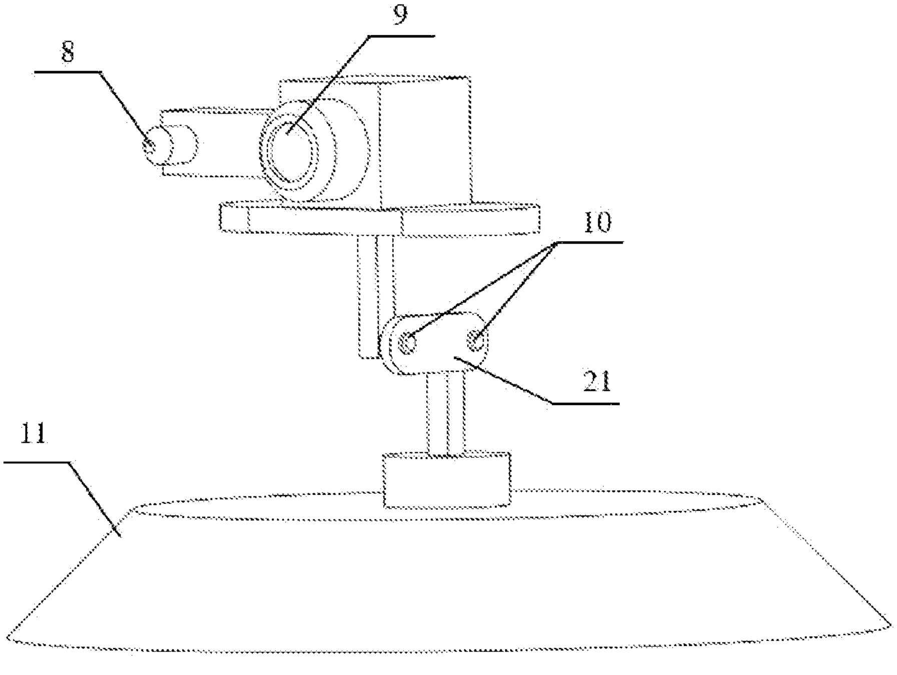
FIG. 2 illustrates a perspective view of an infrared laser assembly of the disclosure.
Figure 3:
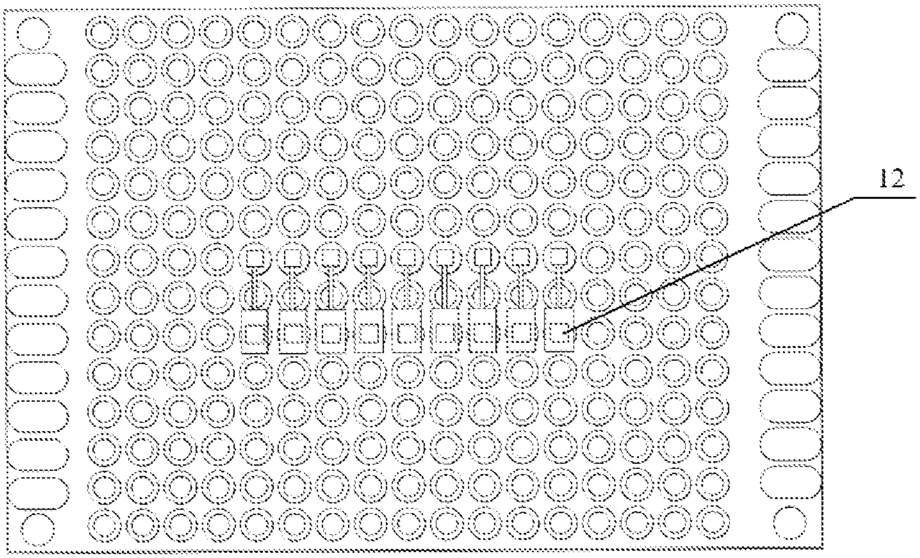
FIG. 3 illustrates a perspective view of a silicon photocell board of the disclosure.

As shown in FIG. 2, an infrared laser assembly 3 includes the infrared light source 9 and the high-speed camera 8, and the infrared light source 9 and the high-speed camera 8 are disposed on the base 11 with a same horizontal line. There are two rotating shafts 10, which are disposed are disposed between the base 11 and the infrared light source 9. The two rotating shafts 10 are configured to connect the base 11 to the infrared light source 9 and the high-speed camera 8, and an elliptical plate 21 is configured to control the infrared light source 9 and the high-speed camera 8 to move up and down by pulling itself.

Figure 4:
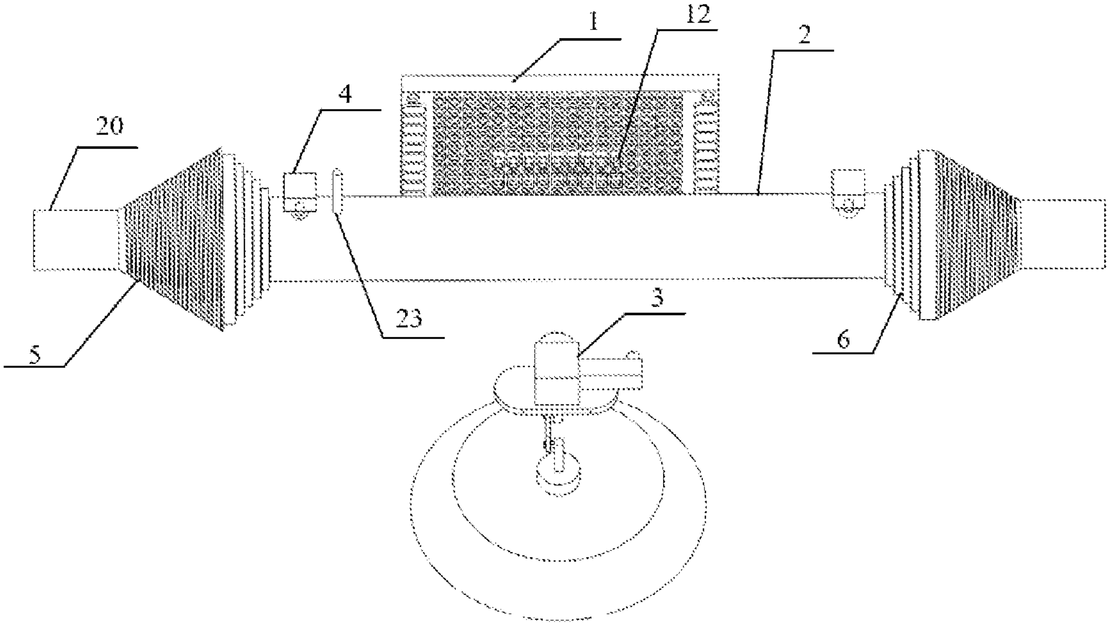
FIG. 4 illustrates a perspective view of a replaceable pipe section, the infrared laser assembly and the silicon photocell board of the disclosure.

The PN junction 12 on the silicon photovoltaic board 1 and the infrared light source 9 are at equal heights, distributed on both sides of the replaceable pipe section, and are at equal heights with the test pipe section 2. As shown in FIG. 4, when the infrared light is irradiated to the PN junctions 12, electromotive force is generated at two ends of each PN junction 12, and certain current and certain voltage are output between electrodes.

Figure 5:
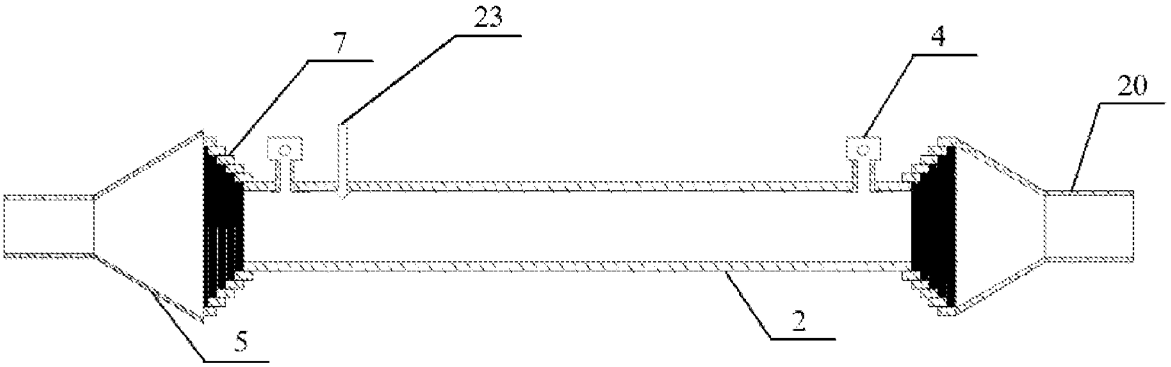
FIG. 5 illustrates a sectional view of the replaceable pipe section of the disclosure.
Figure 6:
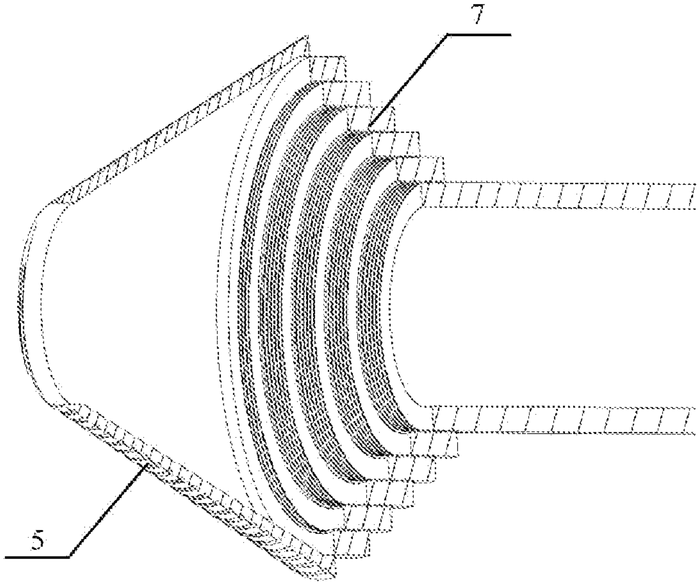
FIG. 6 illustrates a sectional view of a telescopic hose and a reduction nipple of the disclosure.

As shown in FIG. 5, the replaceable pipe section is divided into four parts, the center part is the test pipe section 2 and the infrared light source 9, high-speed camera 8 and differential pressure transmitter 4 are used to test the pipe section. The reduction nipples 6 directly screwed to the test pipe section 2 is configured to replace the test pipe section 2, and the reduction nipples 6 are composed of different sizes of nuts 7 connected by threading, with threads on both an inside and an outside of each nut 7. Outsides of the reduction nipples 6 are connected to the telescopic hoses 5. The telescopic hoses 5 are capable of being stretched in and out, and are configured to make it more convenient to replace the test pipe section 2. As shown in FIG. 6, the telescopic hoses 5 are connected outward to the fixed pipes 20. The color tracer injector 23 is disposed at an initial end of the test pipe section 2, and is configured to determine an average flow velocity of foam.

When using the device, the foam is poured into the foam storage tank 13, and the screw pump 14, the valve A 16, and the valve C 19 are simultaneously opened. Foam and gas are mixed and flow into the test pipe section 2 through the telescopic hoses 5 and the reduction nipples 6 (the screw pump 14 is configured to adjust a frequency to change a foam injection speed, and the gas tank 15 is configured to adjust a valve opening to change the foam injection speed). After the mixed foam and gas is flowed into the test pipe section 2, the infrared light source 9 and the high-speed camera 8 are turned on, and then the infrared light passes through the test pipe section 2 and radiates on the PN junctions 12 of the silicon photocell board 1, thereby generating an electric potential at two ends of each PN junctions 12, and the certain current and voltage are output between the electrodes. A theoretical signal curve at a receiving end is analyzed to obtain a length of a segment of the foam in the test pipe section 2 or a height of different fluids occupying an internal space of the test pipe section 2 under different flow conditions, thereby achieving monitoring the foam volume combining an internal diameter of the test pipe section 2. At the same time, a color tracer is injected at a constant speed using the color tracer injector 23, and a time of the color tracer taking to flow through the test pipe section 2 is recorded. An average flow velocity of the foam is determined by a quotient of a distance and the time. While monitoring the foam volume, characteristics of the flow pattern within the test pipe section 2 are continuously captured and recorded by using the high-speed camera 8, and the pressure drop at the two ends of the test pipe section 2 is obtained by using the differential pressure transmitter 4, thereby achieving synchronously monitoring the foam volume, the flow pattern, and the resistance characteristics of a flow of the mixed foam and gas.

When replacing the test pipe section 2, the nuts 7 of the reduction nipples 6 are unscrewed to remove the test pipe section 2. Then the telescopic hoses 5 are squeezed out, followed by attaching a different test pipe section and screwing the different test pipe section 2, and the foam and the gas are injected again to carry out the same testing steps, thereby achieving monitoring of the foam volume under different pipe materials or diameters.

What is claimed is:

1. A device for monitoring foam volume, flow pattern, and pressure drop in foam drainage gas recovery, wherein the device is configured to monitor the foam volume under different pipe diameters and materials, and observe the flow pattern and resistance characteristics under the foam volume;

wherein the device comprises:

a foam storage tank (13), a screw pump (14), valves, a gas tank (15), a silicon photocell board (1), a test pipe section (2), fixed pipes (20), reduction nipples (6), telescopic hoses (5), a color tracer injector (23), a differential pressure transmitter (4), an infrared light source (9), a camera (8), a base (11), rotating shafts (10), a waste liquid bucket (18), and a computer terminal and data acquisition system (22);

wherein the fixed pipes (20), the reduction nipples (6), the telescopic hoses (5), and the test pipe section (2) form a replaceable pipe section, and the foam storage tank (13) and the gas tank (15) are both located on a side of the replaceable pipe section; the foam storage tank (13) is connected to the screw pump (14) and a valve C (19) of the valves, and the gas tank (15) is connected to a valve A (16) of the valves; the valve A (16) and the valve C (19) converge at a left end of the replaceable pipe section; a right end of the replaceable pipe section is connected to a valve B (17) of the valves, and the valve B ultimately is connected to the waste liquid bucket (18);

wherein the silicon photocell board (1), the differential pressure transmitter (4), the infrared light source (9), and the camera (8) are connected to the computer terminal and data acquisition system (22);

wherein an infrared laser assembly (3) comprises the infrared light source (9) and the camera (8), and the infrared light source (9) and the camera (8) are disposed on the base (11) with a same horizontal line;

wherein there are two rotating shafts (10), the two rotating shafts (10) are disposed between the base (11) and the infrared light source (9), the two rotating shafts (10) are configured to connect the base (11) to the infrared light source (9) and the camera (8), and an elliptical plate (21) is configured to control the infrared light source (9) and the camera (8) to move up and down by pulling itself;

wherein PN junction (12) on the silicon photovoltaic board (1) and the infrared light source (9) are at equal heights, distributed on both sides of the replaceable pipe section, and are at equal heights with the test pipe section (2); when infrared light is irradiated to the PN junctions (12), an electromotive force is generated at two ends of each PN junction (12), and a certain current and a certain voltage are output between electrodes;

wherein the replaceable pipe section is divided into four parts, a center part is the test pipe section (2) and the infrared light source (9), the camera (8) and the differential pressure transmitter are configured to test the pipe section, the reduction nipples (6) directly screwed to the test pipe section (2) is configured to replace the test pipe section (2), and the reduction nipples (6) are composed of different sizes of nuts (7) connected by threading, with threads on both an inside and an outside of each nut (7); outsides of the reduction nipples (6) are connected to the telescopic hoses (5); the telescopic hoses (5) are capable of being stretched in and out, and are configured to make it more convenient to replace the test pipe section (2), and the telescopic hoses (5) are connected outward to the fixed pipes (20); and wherein the color tracer injector (23) is disposed at an initial end of the test pipe section (2), and is configured to determine an average flow velocity of foam.

2. The device for monitoring the foam volume, the flow pattern, and the pressure drop in the foam drainage gas recovery as claimed in claim 1, wherein when using the device, the foam is poured into the foam storage tank (13), and the screw pump (14), the valve A (16), and the valve C (19) are simultaneously opened; after the foam and gas are mixed and flowed into the test pipe section (2) through the telescopic hoses (5) and the reduction nipples (6);

wherein the screw pump (14) is configured to adjust a frequency to change a foam injection speed, and the gas tank (15) is configured to adjust a valve opening to change the foam injection speed;

wherein after the mixed foam and gas is flowed into the test pipe section (2), the infrared light source (9) and the camera (8) are turned on, and then the infrared light passes through the test pipe section (2) and radiates on the PN junctions (12) of the silicon photocell board (1), thereby generating an electric potential at two ends of each PN junctions (12), and the certain current and the certain voltage are output between the electrodes; a theoretical signal curve at a receiving end is analyzed to obtain a length of a segment of the foam in the test pipe section (2) or a height of different fluids occupying an internal space of the test pipe section (2) under different flow conditions, thereby achieving monitoring the foam volume by combining an internal diameter of the test pipe section (2); and wherein a color tracer is injected at a constant speed using the color tracer injector (23), and a time of the color tracer taking to flow through the test pipe section (2) is recorded; an average flow velocity of the foam is determined by a quotient of a distance and the time.

3. The device for monitoring the foam volume, the flow pattern, and the pressure drop in the foam drainage gas recovery as claimed in claim 2, wherein when replacing the test pipe section (2), the nuts (7) of the reduction nipples (6) are unscrewed to remove the test pipe section (2); then the telescopic hoses (5) are squeezed out, followed by attaching another test pipe section (2) and screwing the another test pipe section (2), and the foam and the gas are injected again to carry out the same testing steps, thereby achieving monitoring of the foam volume under different pipe materials or diameters.

4. The device for monitoring the foam volume, the flow pattern, and the pressure drop in the foam drainage gas recovery as claimed in claim 1, wherein when monitoring the foam volume, characteristics of the flow pattern within the test pipe section (2) are continuously captured and recorded by using the camera (8), and the pressure drop at the two ends of the test pipe section (2) is obtained by using the differential pressure transmitter (4), thereby achieving synchronously monitoring the foam volume, the flow pattern, and the resistance characteristics of a flow of mixed foam and gas.

* * * * *